United States Patent
Caillaud et al.

(10) Patent No.: US 8,396,615 B2
(45) Date of Patent: Mar. 12, 2013

(54) METHOD FOR CHANGING THE PATH FOLLOWED BY AN AIRCRAFT, THE AIRCRAFT INITIALLY FOLLOWING A PREDEFINED PATH, THE METHOD ALLOWING A POSSIBLE RETURN OF THE AIRCRAFT TO THE PREDEFINED PATH

(75) Inventors: Christophe Caillaud, Blagnac (FR); Guy Deker, Cugnaux (FR)

(73) Assignee: Thales, Neuilly sur Seine (FR)

( * ) Notice: Subject to any disclaimer, the term of this patent is extended or adjusted under 35 U.S.C. 154(b) by 1354 days.

(21) Appl. No.: 11/844,473

(22) Filed: Aug. 24, 2007

(65) Prior Publication Data

US 2008/0059058 A1     Mar. 6, 2008

(30) Foreign Application Priority Data

Aug. 30, 2006  (FR) ...................................... 06 07632

(51) Int. Cl.
| | |
|---|---|
| G05D 1/00 | (2006.01) |
| G05D 3/00 | (2006.01) |
| G06F 17/00 | (2006.01) |
| G01C 21/00 | (2006.01) |
| G01C 21/32 | (2006.01) |
| B64C 19/00 | (2006.01) |

(52) U.S. Cl. .......... 701/11; 701/416; 701/466; 701/467; 340/971; 244/76 R

(58) Field of Classification Search .................. 701/1, 3, 701/4, 11, 14, 200, 205, 208, 211, 300, 302, 701/400, 408, 409, 431, 466, 467, 468, 528, 701/532, 538, 410, 416; 340/945, 971, 995.19, 340/979; 244/75.1, 76 R, 175

See application file for complete search history.

(56) References Cited

U.S. PATENT DOCUMENTS

| | | | |
|---|---|---|---|
| 5,646,854 A | 7/1997 | Bevan | |
| 6,163,744 A | 12/2000 | Onken et al. | |
| 6,246,957 B1 | 6/2001 | Barrer et al. | |
| 2004/0122567 A1* | 6/2004 | Gaier | 701/4 |
| 2006/0025899 A1* | 2/2006 | Peckham et al. | 701/3 |
| 2006/0195234 A1* | 8/2006 | Chen et al. | 701/3 |
| 2007/0208465 A1* | 9/2007 | Gremmert | 701/4 |
| 2008/0183343 A1* | 7/2008 | Brent et al. | 701/3 |

FOREIGN PATENT DOCUMENTS

| | | |
|---|---|---|
| WO | 0229363 | 4/2002 |
| WO | 2005012837 | 2/2005 |

* cited by examiner

*Primary Examiner* — Thomas Tarcza
*Assistant Examiner* — Edward Pipala
(74) *Attorney, Agent, or Firm* — Lowe Hauptman Ham & Berner, LLP

(57) ABSTRACT

The present invention relates to a method for changing the path followed by an aircraft, the aircraft initially following a predefined path on the basis of a sequence of waypoints, the method allowing a subsequent return of the aircraft to the predefined path in the same direction or in the reverse direction. The method allows a possible return of the aircraft to the predefined path in the same direction such that the waypoints of the predefined path are projected onto a new path according to a projection function ensuring that the order of the sequence of the projected image points complies with the order of the sequence of the original waypoints. The projection of a waypoint already reached by the aircraft also is considered as having been reached. The projections of the waypoints on the new path are considered reached by the aircraft progressively as the latter progresses along the new path. The aircraft eventually rejoins the predefined path at the first waypoint in the order of the sequence of points whose projection is not yet considered as reached on the new path.

16 Claims, 2 Drawing Sheets

METHOD FOR CHANGING THE PATH FOLLOWED BY AN AIRCRAFT, THE AIRCRAFT INITIALLY FOLLOWING A PREDEFINED PATH, THE METHOD ALLOWING A POSSIBLE RETURN OF THE AIRCRAFT TO THE PREDEFINED PATH

RELATED APPLICATIONS

The present application is based on, and claims priority from, France Application Number 0607632, filed Aug. 30, 2006, the disclosure of which is hereby incorporated by reference herein in its entirety.

FIELD OF THE INVENTION

The present invention relates to a method for changing the route followed by an aircraft, the aircraft initially following a predefined path based on a sequence of waypoints. It allows a possible return of the aircraft to the predefined path in the same direction or in the reverse direction. It applies for example to the avionics field.

BACKGROUND OF THE INVENTION

A flight plan is the detailed description of the route to be followed by an aircraft in the context of a planned flight. It comprises in particular a chronological sequence of waypoints named and described by their position, their altitude and the time they are flown over. The waypoints constitute the reference path to be followed by the aircraft for the purpose of complying as well as possible with its flight plan. This reference path is a valuable aid both to the control personnel on the ground and to the pilot, for anticipating the movements of the aircraft and thus to ensure an optimum safety level, in particular in the context of maintaining criteria relating to the separation between aircraft. The flight plan is currently managed on board aircraft by a system named "Flight Management System" in English terminology, which will be referred to as FMS hereafter, which makes the reference path available to the flying personnel and to other on-board systems, such as display and acquisition interfaces. Essentially with safety in mind, it is therefore necessary to ensure that the aircraft follows the reference path described in the flight plan, at least in geographic terms and possibly in time terms. In order to do this, guidance procedures make it possible to slave the aircraft to the reference path. For example, the automatic pilot in "managed" mode generates maneuvers on the basis of the reference path made available by the FMS and executes them automatically. This makes it possible to follow the path corresponding to the reference path as closely as possible in four-dimensional space.

However, in certain situations, the pilot or the controller asks for an alteration or modification of the route. For example, the reference path can bring the aircraft to cross another aircraft, thus violating the lateral separation criteria. From his control center on the ground, the air traffic controller in charge of the flight notices the risk in advance because he knows the whole of the air situation within a large perimeter around the aircraft he is controlling. He therefore implements pre-established procedures for coordination between the ground and the aircraft, these procedures being currently grouped in English terminology by the term "Radar Vectoring". In fact, the controller knows the position of an aircraft he is guiding by virtue of a radar and it is from this secured position that he derives the path to make the aircraft follow. The "Radar Vectoring" procedures can for example make it possible to ensure the crossing of two aircraft in conditions of optimum safety. They are based on a set of guidance commands or "instructions", also predefined, which the controller passes on to the pilot. These instructions are wrongly grouped in English terminology by the term "clearance". The pilot carries out manually the guidance instructions that he receives, one after the other, each time confirming their execution to the controller. Very often, the instructions are given exclusively orally by VHF radio, with the pilot also confirming the execution vocally. Certain recent systems use in parallel digital data links for exchanging some guidance instructions, these being for example in the textual format of the RTCA DO-258 standard, examples of which are given below.

In certain cases, the pilot manually updates the reference path of the flight plan in the FMS, in order that the latter is consistent with the guidance instruction. He does this in particular when the instruction received also indicates how to rejoin the reference path. For example, on receiving a direct flight instruction "PROCEED DIR TO [PT]" according to the RTCA DO-258 standard, where PT is a waypoint of the reference path, and which tells the pilot to head directly towards the point PT, the pilot deletes all of the waypoints before the point PT in the reference path that have not yet been passed. The direct flight instruction is generally given by a controller when the separation constraints are relaxed following a reduction in the density of air traffic. It allows the aircraft to take a shortcut without additional risk when traffic authorizes it. But it can also be envisaged that a direct flight instruction is given in the context of an avoidance procedure between two aircraft. In the short term, the reference path thus becomes a direct segment between the current position of the aircraft and the point PT, the waypoints beyond PT in the path remaining unchanged. The reference path, which is consistent with the real movements of the aircraft when the pilot updates the FMS by deleting the waypoints, can thus be used by the automatic pilot in "managed" mode and/or again be sent over the data link to the control centers on the ground.

Sometimes however, before even having reached the point PT according to the direct flight instruction, the controller can cancel his previous instruction "PROCEED DIRECT TO [PT]" or can issue an instruction to return to the flight plan "PROCEED BACK ON ROUTE" according to the RTCA DO-258 standard, which tells the pilot to rejoin the initial reference path of the flight plan. Unfortunately, the points which preceded the point PT and which have been deleted manually from the reference path following the direct flight instruction are no longer known by the FMS. Even the function of the FMS used to cancel an order, known in English terminology as the "undo" function, cannot be used for restoring them because it only applies to the temporary flight plan. Firstly, this function to cancel an order generally has a limited memory, storing only the latest orders given, or even only the very last one. Therefore it is not guaranteed that it can go sufficiently far back into the commands given, particularly if a large number of points have been deleted. In addition, even if the memory of the function to cancel an order is sufficient, another order has been able to be given to the FMS since the giving of the point deletion orders, this order probably having nothing to do with the application of the direct flight instruction. Most certainly, it must not be cancelled. However, the function to cancel an order of the FMS does not allow selective canceling; it allows only the cancellation of a more or less long consecutive sequence of the last orders given. Finally, even if no order had been given since the cancellation of the points, the restoration of the points by the function to cancel an order would not result in an acceptable situation. In fact, the flight plan would be retrieved exactly as it was before the giving of deletion orders. In particular, at least a portion of the dynamic information relating to the progression of the aircraft on the flight plan would suddenly correspond to the position of the aircraft before the deletion orders and no longer to its current position. For example, the first waypoints deleted would not be marked as passed after their retrieval, whereas they are probably far behind the aircraft. The algorithms for monitoring and updating the progression would risk failing to manage this unexpected inconsistency. Therefore the function to cancel an order of the FMS does definitively not respond to the operational problem presented here. An FMS of today cannot retrieve the points in question, which must at present be considered as definitively deleted. The initial reference path is therefore no longer available and the FMS cannot be of any help in the execution of a "PROCEED BACK ON ROUTE" instruction to return to the initial flight path in the current state of affairs.

A first solution is to recopy the active flight plan, which is the one currently being followed by the aircraft and made available to other systems by the FMS, into another flight plan called "secondary", also managed by the FMS. Depending on the FMS system and on its version, from one to three secondary flight plans can be created and managed simultaneously, in addition to the active flight plan. They undergo exactly the same processing as the active flight plan; in particular the dynamic information relating to the progression of the aircraft is regularly updated according to the current position of the aircraft. However, only the active flight plan is made available to other systems such as the automatic pilot or the air traffic management systems on the ground via data links. The secondary flight plans are available only to the pilot and to the copilot by the intermediary of man-machine interfaces of the FMS, which make it possible to create, display, modify or delete secondary flight plans. Thus, on reception of the direct flight instruction mentioned above, the pilot firstly creates a secondary flight plan by recopying the active flight plan, and then only he deletes the waypoints of the active flight plan. On the subsequent reception of the instruction to return to the flight plan, the pilot activates the secondary flight plan which he has just created, which therefore becomes the active flight plan, the old active flight plan automatically becoming a secondary flight plan. The new active flight plan is up to date, in particular with regard to the dynamic information relating to the progression of the aircraft. The change from one flight plan to the other is virtually transparent and is done with relative continuity.

However, even if the FMS's of today provide all the services facilitating the creation and activation of a secondary flight plan from the active flight plan, this type of procedure is used in too many situations, not only that of the direct flight instruction followed by the return to the flight plan instruction. Thus, in view of the limited capabilities of FMS's to manage secondary flight plans, it can happen that recourse to this procedure is no longer possible for reasons of saturation of the FMS with secondary flight plans. The pilot is therefore presented with two alternatives. The first alternative is that the pilot can delete the waypoints of the active flight plan without the backup offered by a secondary flight plan. He then risks subsequently having to reenter them manually in the active flight plan, if he receives a return to flight plan instruction. If necessary, the pilot must use a paper version of the flight plan which allows him to find the previously deleted points. Sometimes he does not find all of them again, making this procedure rather uncertain. Then he must mark each of the reentered points that have been passed by the aircraft, this being done according to its current position. It is obvious that this manual procedure of reentering points constitutes a significant work overload which dangerously diverts the copilot from his nominal task. The second alternative is that the pilot can execute manually the direct flight instruction in visual flight without updating the flight plan in the FMS. The aircraft no longer follows the flight plan and no automatic procedure based on the flight plan can thereafter be engaged, in particular the automatic piloting in "managed" mode. Moreover, the systems on the ground receive a flight plan no longer corresponding to the real path of the aircraft. Here again, it is obvious that such a procedure is carried out to the detriment of safety. Without doubt it will no longer be operational when stricter standards which use a "4D" tube surrounding the route of the flight plan come into service.

SUMMARY OF THE INVENTION

The particular purpose of the invention is to overcome, at least partially, the aforesaid problems by retaining the deleted waypoints in the active flight plan, but without presenting them to the pilot, this being done in view of dynamically updating the status of the deleted points with respect to the progression of the aircraft, in anticipation of a possible restoration of these points and despite the fact that they are no longer flown over. It minimizes manual interventions and no longer even requires the use of a secondary flight plan. For this purpose, an object of the invention is a method for changing the route followed by an aircraft, the aircraft initially following a predefined path on the basis of a sequence of waypoints, the method allowing a return of the aircraft to the predefined path. The waypoints of the predefined path are projected onto a new path according to a projection function ensuring that the order of the sequence of projected image points complies with the order of the sequence of the original waypoints. The projection of a waypoint already reached by the aircraft is also considered as reached. Then the projections of waypoints on the new path are considered reached by the aircraft progressively as the aircraft progresses over the new path. In the case in which the aircraft rejoins the predefined path, it rejoins it at the first waypoint in the order of the sequence of points whose projection is not yet considered reached in the new path.

An object of the invention is also a method of changing the route followed by an aircraft, the aircraft initially following a predefined path on the basis of a sequence of waypoints, the method allowing a return of the aircraft to the predefined path in the reverse direction. The waypoints of the predefined path are projected onto a new path according to a projection function ensuring that the order of the sequence of the projected image points complies with the order of the sequence of the original waypoints. The projection of a waypoint already reached by the aircraft is also considered as reached. Then the projections of the waypoints on the new path are considered reached by the aircraft progressively as the aircraft progresses on the new path. In the case in which the aircraft rejoins the predefined path in the reverse direction, it rejoins it at the last waypoint in the order of the sequence of the points whose projection has been considered as reached on the new path.

The change of route followed by the aircraft can include the deletion of consecutive waypoints in the predefined path, the new path advantageously being able to be the segment connecting the position of the aircraft on the predefined path to the waypoint following the last deleted point.

The new path can be provided by an air traffic controller, the controller being able to initiate the return to the predefined path.

Advantageously, the predefined path can be part of a flight plan managed automatically on board the aircraft by a dedicated system. The deleted waypoints can be stored by the system among long-duration strategic data and the projected points can be stored among the short-duration tactical data, the system not carrying out processing on the strategic data when the latter are superseded by tactical data.

Also advantageously, the projection of a deleted waypoint can be the point of the new path situated at the shortest distance from the deleted waypoint.

The aircraft can possibly rejoin the predefined path at the first waypoint in the order of the sequence of points whose projection is not yet considered as reached on the new path and which makes it possible to rejoin the predefined path with an angle of convergence less than 45 degrees without making a U-turn.

Besides the fact of solving a known operational problem like that of returning to the initial route of the flight plan, the invention also has as a principal advantage, that being the fact that it makes it possible not to monopolize a secondary flight plan. In fact, the use of secondary flight plans is very often the panacea of many other operational problems. The invention thus makes it possible to keep the secondary flight plans available to deal with other unforeseen problems. It also makes it possible to relieve the crew from fastidious manual tasks requiring intense attention.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

Other features and advantages of the invention will appear with the help of the following description given with reference to the appended drawings in which.

DETAILED DESCRIPTION OF THE DRAWINGS

Figure 1:
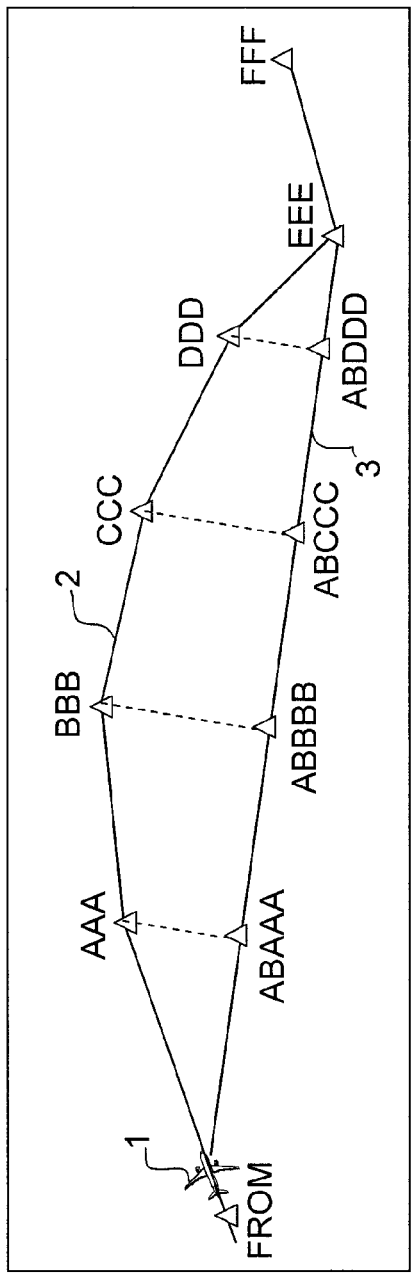
FIG. 1 illustrates, by means of a diagram, an operational example of a change of route according to the invention.

FIG. 1 is a diagrammatic illustration of an operational example of a change of route according to the invention. For example, this can be the display of a flight plan to a pilot by the intermediary of the man-machine interface of an FMS. An aircraft 1 is following a predefined path 2, the latter comprising in particular six waypoints AAA, BBB, CCC, DDD, EEE and FFF. A waypoint corresponds to a position defined by a latitude and a longitude, which the aircraft 1 must fly over at an imposed altitude. In FIG. 1, the six waypoints AAA, BBB, CCC, DDD, EEE and FFF have not yet been flown over by the aircraft 1, which is currently flying along a segment ending at the waypoint AAA. While it is flying the segment ending at the waypoint AAA, the aircraft 1 can for example receive from its controller on the ground an instruction to fly direct to the point EEE, that is to say "PROCEED DIR TO EEE". This instruction is generally given by the controller when the airspace is free up to the point EEE, without any traffic separation problem. Advantageously, the pilot can therefore change heading in order to fly along a diversion path 3 which is direct between the position where the aircraft 1 is when it receives the instruction, named FROM in English terminology, indicating that the aircraft 1 comes "from" this position, and the waypoint EEE. The aircraft 1 is no longer constrained to pass through the points AAA, BBB, CCC and DDD. In the example of FIG. 1, the instruction to fly direct to point EEE can therefore advantageously be summarized as the deletion of the four waypoints AAA, BBB, CCC and DDD of the path 2 and their replacement by a segment connecting the position of the aircraft 1 and the waypoint following DDD, that is to say the point EEE.

However, as the aircraft 1 has an FMS system which automatically manages its flight plan, the latter can nevertheless retain in memory the waypoints AAA, BBB, CCC and DDD that no longer have to be flown over. It can thus carry out the projection of these four points onto the diversion path 3. Advantageously, the projected image point on the diversion path 3 of an original waypoint of the path 2 can simply be the point of the path 3 which is the closest to the waypoint in question. Thus, in the example of FIG. 1, a point ABAAA is the projection of the point AAA on the diversion path 3, a point ABBBB is the projection of the point BBB, a point ABCCC is the projection of the point CCC and a point ABDDD is the projection of the point DDD. The flight plan whose initial route was "AAA-BBB-CCC-DDD-EEE-FFF" has thus been converted into "ABAAA-ABBBB-ABCCC-ABDDD-EEE-FFF" by the instruction to fly direct to the point EEE. In the example of FIG. 1, the direct flight instruction results in a lateral diversion: the points AAA, BBB, CCC and DDD are gone round laterally or "abeam" and not above or below. It is therefore usual in aeronautics to prefix the points of a sideways diversion path with "AB", "AB" being the abbreviation of the English word "abeam".

Advantageously, the FMS can simultaneously manage flight data known as "reference data" of strategic nature, that is to say of long duration, with flight data known as "instruction data" of tactical nature, that is to say of short duration. Thus the waypoints AAA, BBB, CCC and DDD, which are data published even before the takeoff of the aircraft 1, can be stored as reference data. In the example of FIG. 1, the projected points ABAAA, ABBBB, ABCCC and ABDDD are the consequence of an unforeseen and perhaps temporary decision by the controller; they can therefore be stored as instruction data. Advantageously, the predictions, in particular the times of passing through the points, can be calculated as a priority using the instruction data that ABAAA, ABBBB, ABCCC and ABDDD are. In fact, the predictions are no longer necessary for the reference data that AAA, BBB, CCC and DDD are, these reference data having been superseded by the tactical data ABAAA, ABBBB, ABCCC and ABDDD.

It is important to note that the projection is made in respect of the order of the sequence of waypoints. In fact, following the direction of movement of the aircraft 1, AAA is the first waypoint on the path 2 and ABAAA is also the first projected point on the path 3. BBB is the second waypoint and ABBBB is the second projected point. CCC is the third waypoint and ABCCC is the third projected point. Finally, DDD is the fourth waypoint and ABDDD is the fourth projected point.

The automatic features for saving the deleted waypoints and for projection of these points on the diversion path can advantageously be the subject of a development of the direct flight function of today, which is now and henceforth made available by the FMS systems.

Subsequently, the controller on the ground can cancel the direct flight instruction "PROCEED DIR TO EEE" by giving, for example, an instruction of the "PROCEED BACK ON ROUTE" type as already described above. The aircraft 1 must then resume the path 2 such as initially defined, this being done in respect of conditions possibly coming with the instruction. According to these conditions, the aircraft 1 must again pass though certain waypoints among AAA, BBB, CCC and DDD which had previously been deleted. This is what is illustrated in the following figures.

Figure 2:
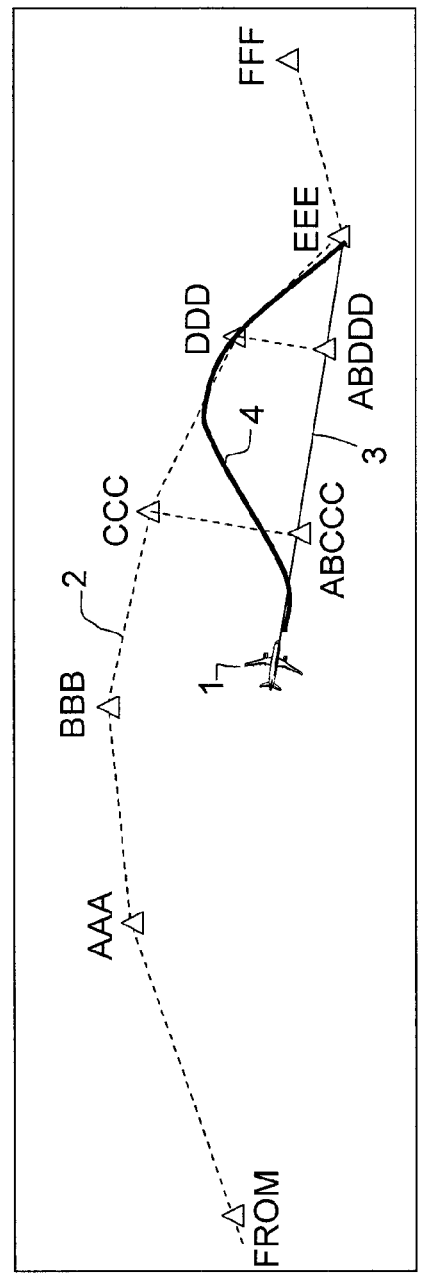
FIG. 2 illustrates, by means of a diagram, an operational example of a return to the initial path according to the invention.

FIG. 2 is a diagrammatic illustration of an operational example of a return to the initial path according to the invention, in the case in which neither the controller nor the pilot would propose a point of return to the initial path. For this purpose, FIG. 2 is based on the same example of change of route as that of FIG. 1, namely the change of route of the aircraft 1 initially following its initial path 2 in order to follow the diversion path 3. Even though it has already flown over the points ABAAA and ABBBB shown in FIG. 1 and it is moving towards the point ABCCC, the aircraft 1 receives, for example, a "PROCEED BACK ON ROUTE" instruction with no other details. In this case, the FMS can automatically propose a return path to the path 2. Advantageously, as shown for example in FIG. 2, this can be a path 4 starting from the current position of the aircraft 1 when it receives the instruction and rejoining the path 2 at its first waypoint whose projection has not yet been reached by the aircraft 1 and which can be rejoined with a convergence angle of less than 45 degrees without making a U-turn. In fact, the first waypoint for whose projection has not yet been reached by the aircraft 1 is the point CCC. However, in order to rejoin the point CCC, two alternatives are presented to the aircraft 1. The first alternative is to enter the path 2 at the point CCC, but with an angle of convergence greater than 45 degrees, which is not recommended. The angle of convergence is the angle between the tangent to the path 2 at the point CCC and the tangent to the path of entry at the point CCC. The second alternative is to align the aircraft 1 with the path 2 by carrying out virtually a complete turn, which is neither economic nor recommended, the separation from aircraft flying before and behind being more difficult to maintain. With regard to the point DDD, it has also not been reached and, furthermore, it can be rejoined without making a U-turn since a heading variation of the aircraft 1 well below 90 degrees suffices to rejoin this point with a convergence angle with the path 2 of less than 45 degrees. A U-turn is understood to be a change of heading of the order of substantially 180 degrees. In the example of FIG. 2, it is therefore at the point DDD that the aircraft rejoins the path 2 by following the path 4. The automatic function of calculating a path making it possible to resume the initial path can constitute a development of the function of today to return to the route of the flight plan, which is now and henceforth made available by the FMS systems.

Figure 3:
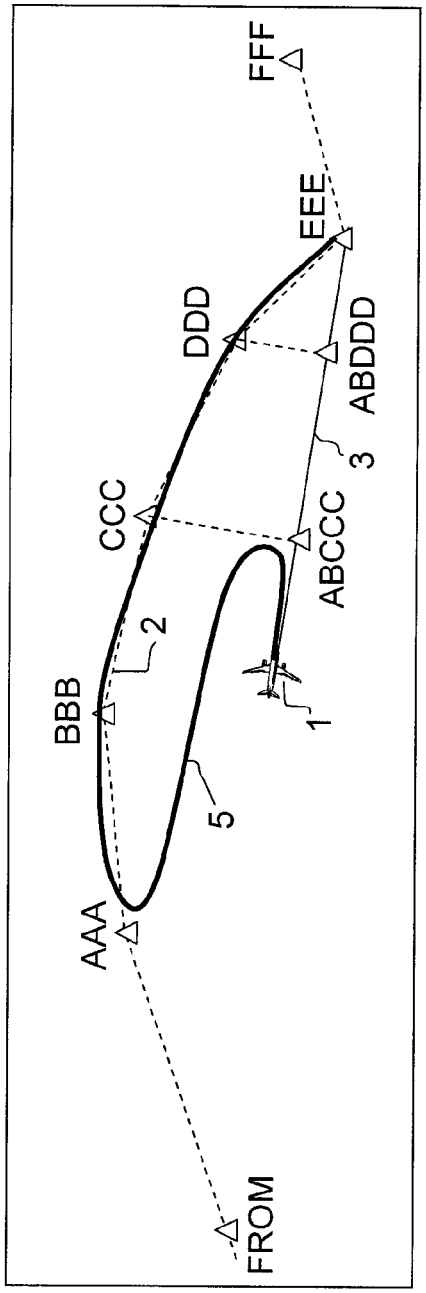
FIG. 3 illustrates, by means of a diagram, an operational example of a return to an initial path, the controller or the pilot specifying a point of return.

FIG. 3 is a diagrammatic illustration of another operational example of a return to an initial path, in the case where the controller or the pilot would propose a return point on the path. For this purpose, FIG. 3 is based on the same change of route example as that of FIGS. 1 and 2. As in the example of FIG. 2, even though it has already flown over the points ABAAA and ABBBB shown in FIG. 1 and it is moving towards the point ABCCC, the aircraft 1 receives a "PROCEED BACK ON ROUTE" instruction. This time the pilot decides to select a point for rejoining the path 2, this point being different from the default point DDD: he selects the point BBB. The FMS proposes a path 5 making it possible to rejoin the path 2 at the point BBB with a convergence angle less than 45 degrees. Here again, this automatic function of calculating a path making it possible to rejoin the initial path at a precise waypoint can constitute a development of the function of today to return to the route of the flight plan, which is now and henceforth made available by the FMS systems.

Figure 4:
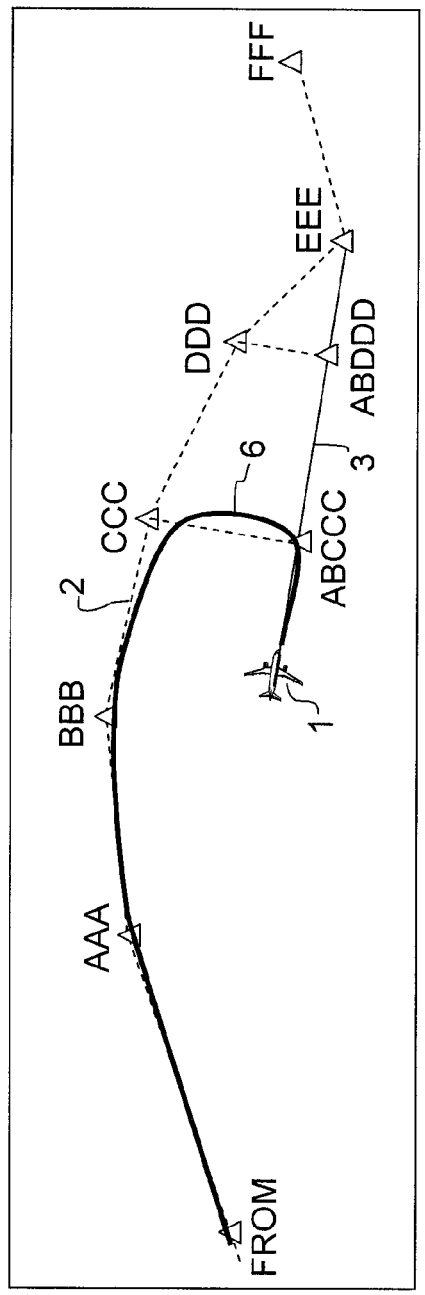
FIG. 4 illustrates, by means of a diagram, another operational example of a return to an initial path according to the invention, the path being resumed in the reverse direction.

FIG. 4 is a diagrammatic illustration of yet another operational example of a return to an initial path according to the invention, in the exceptional case where the controller gives the turn back order. For this purpose, FIG. 4 is based on the same example of change of route as that of FIGS. 1, 2 and 3. As in the example of FIGS. 2 and 3, although it has already flown over the points ABAAA and ABBBB shown in FIG. 1 and it is moving towards the point ABCCC, the aircraft 1 can for example receive a "PROCEED BACK ON ROUTE" instruction. This time however the controller can state that it is necessary to rejoin the initial path 2 in order to follow it in the reverse direction in order to rejoin the starting point. The FMS can propose a path 6 making it possible to rejoin the path 2 in the reverse direction at the point BBB, which is the last waypoint whose projection has been reached. In fact, BBB precedes CCC, which is the first waypoint whose projection has not yet been reached. In the example of FIG. 3, the path 6 enters the path 2 with a convergence angle of less than 45 degrees. Here again the automatic function of calculating a path making it possible to resume the initial path in the reverse direction can constitute a development of the function of today to return to the route of the flight plan, which is now and henceforth made available by the FMS systems.

It is important to note that the invention is easily applicable to any operational procedure involving the deletion of points in the initial path of the flight plan and for which the deleted points can be projected on the new path in such a way that the order of the projected points is the same as the order of the deleted points. For example, it is applicable to the simple case of deleting a waypoint, this waypoint having been able to be projected on the segment connecting the point which precedes it and the point which follows it, the rank of the point thus projected being the same as the rank of the deleted point.

The invention described above has a tolerably low cost of implementation in existing FMS systems. In fact, it can be seen as a simple improvement of the path calculation functions already implemented in these systems. At display level, the existing display functions already cover the rather conventional needs of the invention. In particular, the invention does not necessitate the integration of any new sub-systems. Only the validation phase requires a sufficiently consequent set of scenarios in order to ensure a sufficient cover of the multiple cases of predefined paths and of diversion paths.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed:

1. A method performed by a Flight Management System of an aircraft for planning a path followed by the aircraft, the aircraft initially following a first path defined by a sequence of waypoints (AAA, BBB, CCC, DDD, EEE, FFF), the aircraft leaving the first path in order to follow a second path, the method allowing a subsequent return of the aircraft to the first path, comprising the steps of:

one-to-one projecting the waypoints (AAA, BBB, CCC, DDD) of the first path onto the second path according to a projection function ensuring that the order of the sequence of the projected image points (ABAAA, ABBBB, ABCCC, ABDDD) complies with the order of the sequence of the original waypoints (AAA, BBB, CCC, DDD), the projection of a waypoint already reached by the aircraft also being considered as having been reached;

wherein the projections of the waypoints (ABAAA, ABBBB, ABCCC, ABDDD) on the second path are considered reached by the aircraft progressively as the latter progresses along the second path; and planning the path to guide the aircraft subsequently rejoining the first path at the first waypoint in the order of the sequence of waypoints whose projection is not yet considered as reached on the second path.

2. The method as claimed in claim 1, wherein the planning of the path followed by the aircraft includes the deletion of consecutive waypoints (AAA, BBB, CCC, DDD) in the first path.

3. The method as claimed in claim 2, wherein the second path is the segment connecting the position (FROM) of the aircraft on the first path to the waypoint (EEE) following the last point deleted (DDD) in the first path.

4. The method as claimed in claim 3, wherein the second path is provided by an air traffic controller, the controller initiating the return to the first path.

5. The method as claimed in claim 4, wherein the first path is part of a flight plan managed automatically on board the aircraft by a dedicated system, the deleted waypoints (AAA, BBB, CCC, DDD) being stored by the system amongst strategic data of long duration and the projected points (ABAAA, ABBBB, ABCCC, ABDDD) being stored amongst tactical data of short duration, the system not carrying out processing on the strategic data when the latter are superseded by tactical data.

6. The method as claimed in claim 3, wherein the projection of a deleted waypoint is the point on the second path situated at the shortest distance from the deleted waypoint.

7. The method as claimed in claim 1, wherein the aircraft rejoins the first path at the first waypoint in the order of the sequence of points (DDD) whose projection is not yet considered as reached on the second path and which makes it possible to rejoin the first path with an angle of convergence less than 45 degrees without making a U-turn.

8. A method performed by a Flight Management System of an aircraft for planning a path followed by the aircraft, the aircraft initially following a first path defined by a sequence of waypoints (AAA, BBB, CCC, DDD, EEE, FFF), the aircraft leaving the first path in order to follow a second path, the method allowing a subsequent return of the aircraft to the first path in the reverse direction, comprising the steps of:

one-to-one projecting the waypoints (AAA, BBB, CCC, DDD) of the first path onto the second path according to a projection function ensuring that the order of the sequence of the projected image points (ABAAA, ABBBB, ABCCC, ABDDD) complies with the order of the sequence of the original waypoints (AAA, BBB, CCC, DDD), the projection of a waypoint already reached by the aircraft also being considered as having been reached;

wherein the projections of the waypoints (ABAAA, ABBBB, ABCCC, ABDDD) on the second path are considered reached by the aircraft progressively as the latter progresses along the second path; and planning the path to guide the aircraft subsequently rejoining the first path in the reverse direction at the last waypoint in the order of the sequence of waypoints whose projection has been considered as reached on the second path.

9. The method as claimed in claim 8, wherein the planning of the path followed by the aircraft includes the deletion of consecutive waypoints (AAA, BBB, CCC, DDD) in the first path.

10. The method as claimed in claim 9, wherein the second path is the segment connecting the position (FROM) of the aircraft on the first path to the waypoint (EEE) following the last point deleted (DDD) in the first path.

11. The method as claimed in claim 10, wherein the second path is provided by an air traffic controller, the controller initiating the return to the first path.

12. The method as claimed in claim 11, wherein the first path is part of a flight plan managed automatically on board the aircraft by a dedicated system, the deleted waypoints (AAA, BBB, CCC, DDD) being stored by the system amongst strategic data of long duration and the projected points (ABAAA, ABBBB, ABCCC, ABDDD) being stored amongst tactical data of short duration, the system not carrying out processing on the strategic data when the latter are superseded by tactical data.

13. The method as claimed in claim 10, wherein the projection of a deleted waypoint is the point on the second path situated at the shortest distance from the deleted waypoint.

14. A method of generating a path for an aircraft performed by a Flight Management System of the aircraft, the path being arranged to allow the aircraft to join a first path from a second path, the first path having a plurality of waypoints that defines a flying sequence, the method comprising:

one-to-one projecting the waypoints on the first path onto the second path to generate a plurality of projected waypoints on the second path;

identifying at least one of the waypoints on the first path as reached if a projected waypoint on the second path corresponding to the at least one of the waypoints being determined as flown over by the aircraft; and generating the path to allow the aircraft to subsequently join the first path at a last waypoint on the first path being identified as reached in an order of the flying sequence or a first waypoint being not identified as reached in the order of the flying sequence.

15. The method according to claim 14, wherein the path is arranged to allow the aircraft to join the first path at the last waypoint on the first path being identified as reached in the order of the flying sequence and to fly along the first path in a direction opposite to a direction defined by the flying sequence.

16. The method according to claim 14, wherein the path is arranged to allow the aircraft to join the first path at the first waypoint being not identified as reached in the order of the flying sequence and to fly along the first path in a direction defined by the flying sequence.

* * * * *